(12) United States Patent
Whittingham et al.

(10) Patent No.: US 10,705,402 B2
(45) Date of Patent: Jul. 7, 2020

(54) ELECTRONIC WINDOW ARRAY

(71) Applicant: The Boeing Company, Chicago, IL (US)

(72) Inventors: David Michael Whittingham, Bothell, WA (US); Douglas James Barker, Seattle, WA (US); Sarah Elizabeth Thompson, Freeland, WA (US)

(73) Assignee: The Boeing Company, Chicago, IL (US)

(*) Notice: Subject to any disclaimer, the term of this patent is extended or adjusted under 35 U.S.C. 154(b) by 60 days.

(21) Appl. No.: 15/903,620

(22) Filed: Feb. 23, 2018

(65) Prior Publication Data

US 2019/0265570 A1 Aug. 29, 2019

(51) Int. Cl.
*G02F 1/153* (2006.01)
*G02F 1/163* (2006.01)
*B64C 1/14* (2006.01)

(52) U.S. Cl.
CPC .......... *G02F 1/1533* (2013.01); *B64C 1/1484* (2013.01); *G02F 1/163* (2013.01)

(58) Field of Classification Search
CPC .......... G02F 1/163; G02F 1/155; G02F 1/153; G02F 1/1523; G02F 1/1533; G02F 1/15; G02F 1/157; G02F 1/161; G02F 1/15165; G02F 1/1508; G02F 1/13318; G02F 1/1503; G02F 2001/1555; G02F 2001/15145; G02F 2001/164; G02F 2201/44; G02F 2203/11; G02F 1/0018; G02F 1/1525; G02F 2001/1536; G02F 1/0126; G02F 1/0147; G02F 2202/14; G02F 2202/36; G02F 2203/01; G02F 1/0121; G02F 1/133602; G02F 1/133603; G02F 1/1347; G02F 2001/1502; G02F 1/13306; G02F 1/133308; G02F 1/13336; G02F 1/13439; G02F 1/13458; G02F 1/1506; G02F 1/1676; G02F 1/17; G02F 2001/133626; G02F 2001/1518; G02F 2201/123; G02F 2201/38; G02F 2201/58; G02F 1/01; G02F 1/0102; G02F 1/0107; G02F 1/0128; G02F 1/1309; G02F 1/1313; G02F 1/1323; G02F 1/133305; G02F 1/13338; G02F 1/1334; G02F 1/133512; G02F 1/133514; G02F 1/133516; G02F 1/133528; G02F 1/133615; G02F 1/1339; G02F 1/1345; G02F 1/137; G02F 1/13737; G02F 1/167; G02F 1/19; G02F 2001/13312; G02F 2001/13324; G02F 2001/134345; G02F 2001/1635; G02F 2201/083; G02F 2201/086; G02F 2201/122; G02F 2201/16; G02F 2201/50; G02F 2201/508; G02F 2202/00; G02F 2202/02; G02F 2202/023; G02F 2202/28; G02F 2203/02; G02F 2203/055; G02F 2203/10;
(Continued)

(56) References Cited

U.S. PATENT DOCUMENTS 6,136,161 A 10/2000 Yu et al.
6,407,847 B1 6/2002 Poll et al.
(Continued)

*Primary Examiner* — Bumsuk Won
*Assistant Examiner* — Grant A Gagnon
(74) *Attorney, Agent, or Firm* — Coats & Bennett, PLLC

(57) ABSTRACT

Methods, systems and apparatuses are presented for controlling ambient light transmission through electrochromic devices comprising a plurality of dimmable zones.

19 Claims, 10 Drawing Sheets

(58) Field of Classification Search
CPC . G02F 2203/62; B64C 1/1492; B64C 1/1484;
B64C 1/14
USPC ........................................................ 359/275
See application file for complete search history.

(56) References Cited

U.S. PATENT DOCUMENTS

| | | |
|---|---|---|
| 6,594,067 B2 | 7/2003 | Poll et al. |
| 6,671,080 B2 | 12/2003 | Poll et al. |
| 2012/0033287 A1 | 2/2012 | Friedman et al. |
| 2015/0362817 A1* | 12/2015 | Patterson ................ G02F 1/161 |
| | | 359/275 |
| 2016/0026055 A1* | 1/2016 | Choi ...................... B05D 1/005 |
| | | 156/60 |

* cited by examiner

ELECTRONIC WINDOW ARRAY

TECHNOLOGICAL FIELD

The present disclosure relates generally to the field of electrochromic cells. More specifically the present disclosure relates to the field of transparent windows comprising electrochromic cells.

BACKGROUND

Electrochromism refers to a perceptible and reversible change displayed by materials when an electrical charge is applied that causes an electrochemical redox reaction in materials said to be "electrochromic". Transition metal oxides are one family of materials known to possess electrochromic properties. Electrochromic materials can be used to control the amount of light and heat allowed to pass through transparent media, such as, for example, rear-view mirrors that are tinted in response to various lighting conditions. Further examples of electrochromic materials and devices include electrochromic windows that have found utility in airliner windows where light passage through the windows is impeded when the device is in a charged state.

Electrochromic devices ("ECDs") can reversibly control optical properties such as optical transmission, absorption, reflectance, and emittance, etc., through the application of an electric voltage. Such ECDs include devices such as "smart glass" or "switchable glass", mirrors and display devices. Such ECDs typically comprise an electrochromic layer "sandwiched" between by an electrolytic layer.

Electrochromic windows, also known as "smart windows" have been installed in buildings and vehicles to achieve desired energy efficiency and indoor comfort levels by varying the transmittance of light and solar energy.

Electrochromic arrays comprise layers of material that can be deposited onto a transparent substrate for the purpose of changing the appearance and function of the substrate itself. Thin films of conductive material are disposed onto substrates, and influence adjacently positioned electrochromic materials that are responsive to an applied electric field, with the electrochromic material changing properties from a high-transmittance, non-light absorbing state to a lower-transmittance state capable of absorbing or reflecting incident light. When the electric field is discontinued, or electric polarity is reversed, the electrochromic material in an electrochromic material layer then reverts to its original state and assumes its original transmissive and non-light absorbing properties.

Electrochromic arrays can have distinct layers deposited onto a substrate, and a collection of thin film layers collectively referred to as an electrochromic "stack". Such a layered electrochromic "stack" can include: a first conductive layer, an electrochromic layer, an ion conducting later, a counter electrode and a second conductive layer.

SUMMARY

According to one aspect, the present disclosure is directed to an electrochromic device including a first transparent substrate having an outer surface and an inner surface and a first conductive layer disposed on the inner surface of the first transparent substrate. The electrochromic device further includes a second transparent substrate having an outer surface and an inner surface and a second conductive layer disposed on the inner surface of the second transparent substrate. The electrochromic device further comprises electrochromic medium disposed between the first conductive layer and the second conductive layer, wherein at least one of the first and second conductive layers comprises a plurality of discrete conductive segments.

According to another aspect, each discrete conductive segment is configured to form at least one dimmable zone substantially adjacent to the discrete conductive segment in the electrochromic medium.

In another aspect, in the aforementioned electrochromic device, each dimmable zone is configured to block an amount of ambient light transmissivity through the electrochromic device in an amount ranging from about 0.01% to about 60% transmissivity when the corresponding discrete conductive segment is powered.

In another aspect, a method is disclosed for forming an electrochromic device, with the method including providing a first substrate and a second substrate and disposing a first transparent conductive layer onto the first substrate and removing a portion of the first transparent conductive layer from the first substrate to define a plurality of discrete conductive segments in the first transparent conductive layer In a further aspect, a method is disclosed for controlling the transmission of light through a substantially transparent medium, with the method including orienting an electrochromic device proximate to the transparent medium. The electrochromic device includes a first transparent substrate having an outer surface and an inner surface and a first conductive layer disposed on the inner surface of the first transparent substrate. The electrochromic device further includes a second transparent substrate having an outer surface and an inner surface and a second conductive layer disposed on the inner surface of the second transparent substrate. The electrochromic device further includes an electrochromic medium disposed between the first conductive layer and the second conductive layer, with the electrochromic medium having an initial light transmissivity value. At least one of the first and second conductive layers further comprises a plurality of discrete conductive segments, and the electrochromic medium is disposed adjacent the plurality of discrete conductive segments to form a plurality of dimmable zones adjacent to the plurality of discrete conductive segments. A current is directed from a power source to at least one of the plurality of discrete conductive segments, with the directed current controlled. The transmissivity of light through the electrochromic device is controlled by changing the initial light transmissivity value of at least one of the plurality of dimmable zones to a desired light transmissivity value ranging from about 60% light transmissivity to about 0.01% light transmissivity.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
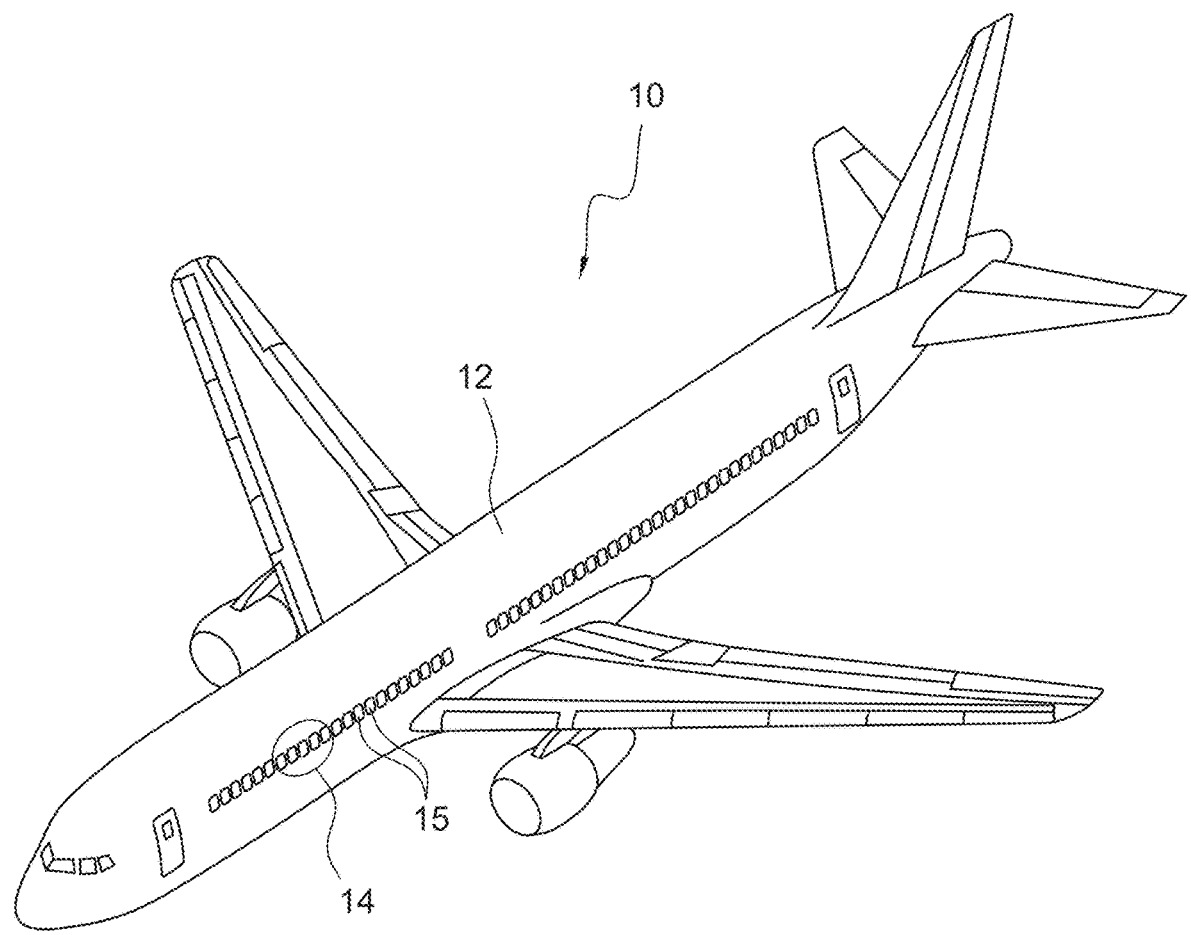
Figure 2:
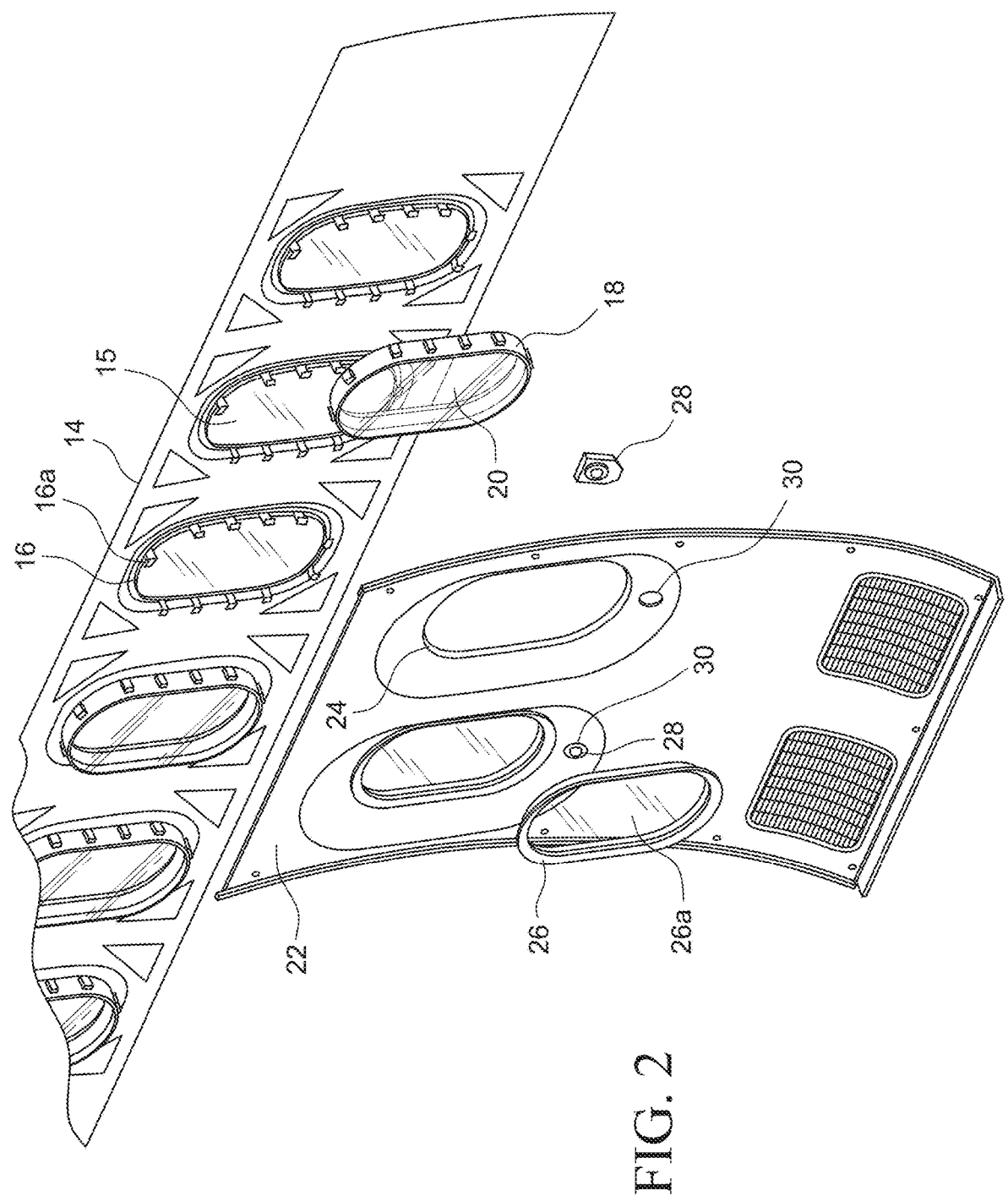
Figure 3A:
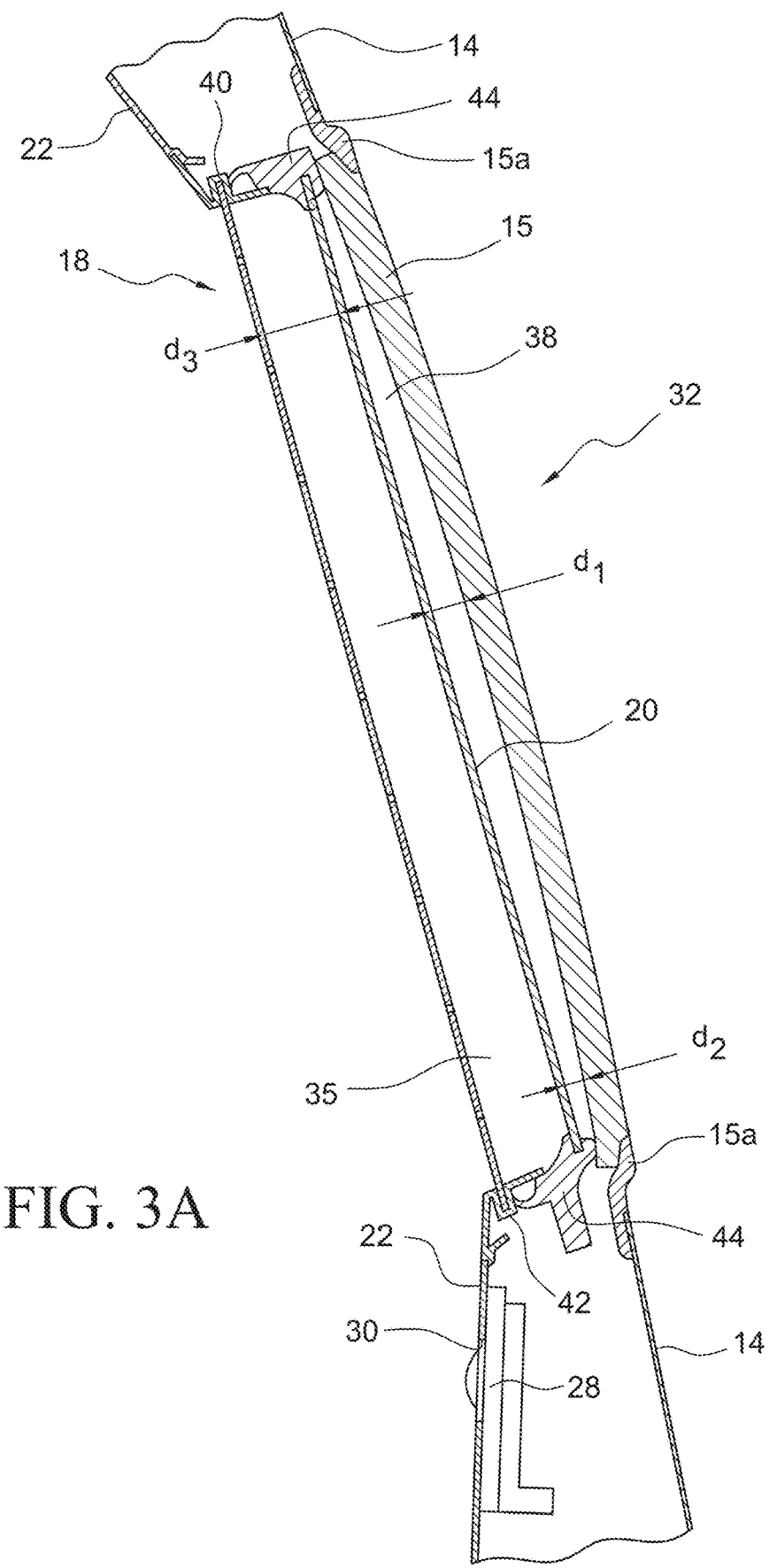
Figure 3B:
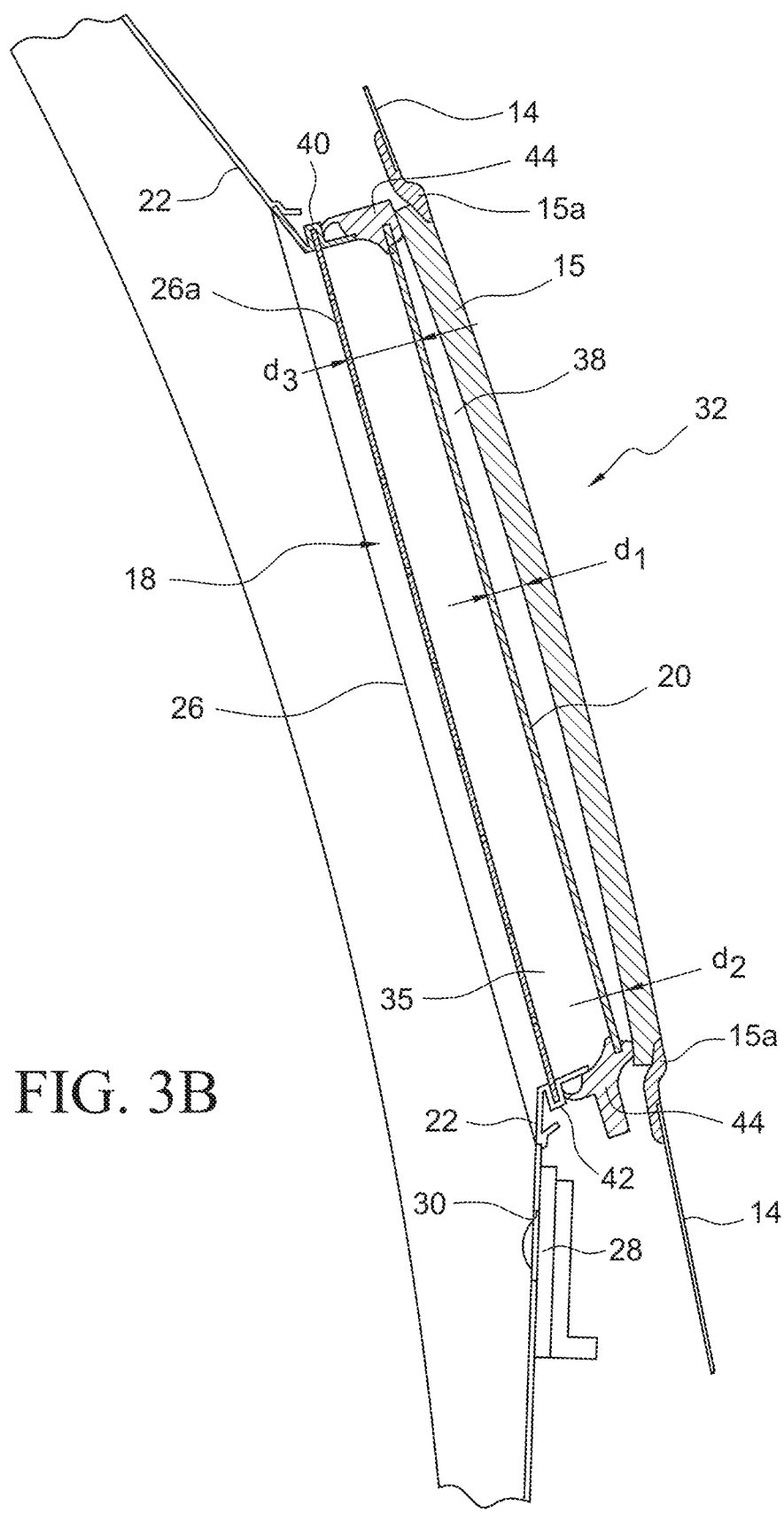
Figure 4:
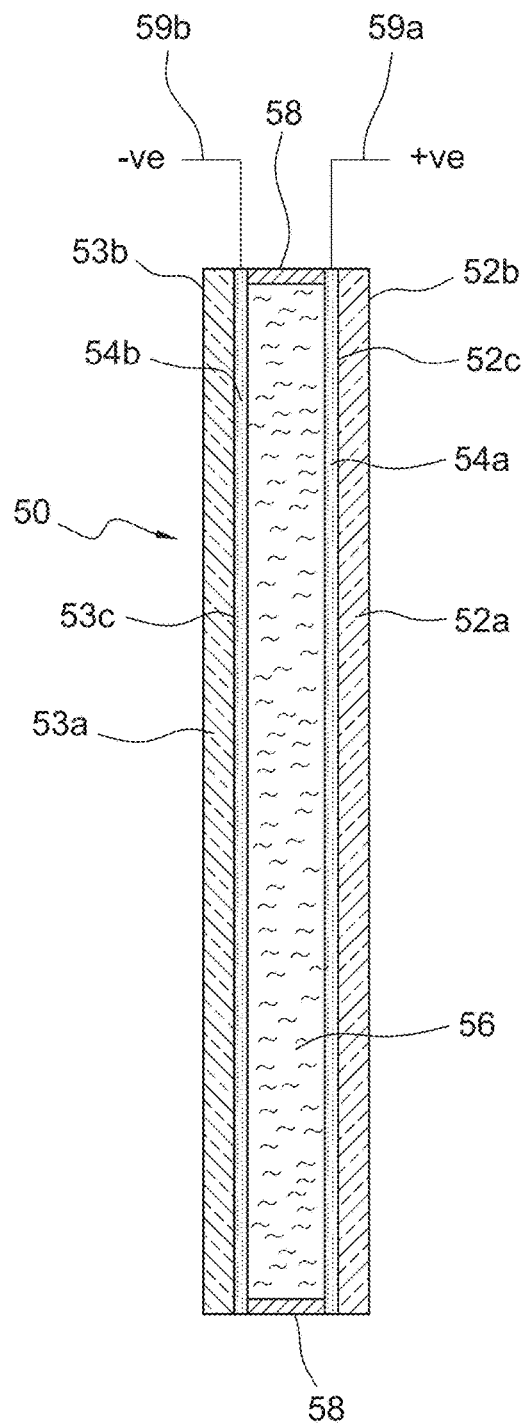
Figure 5:
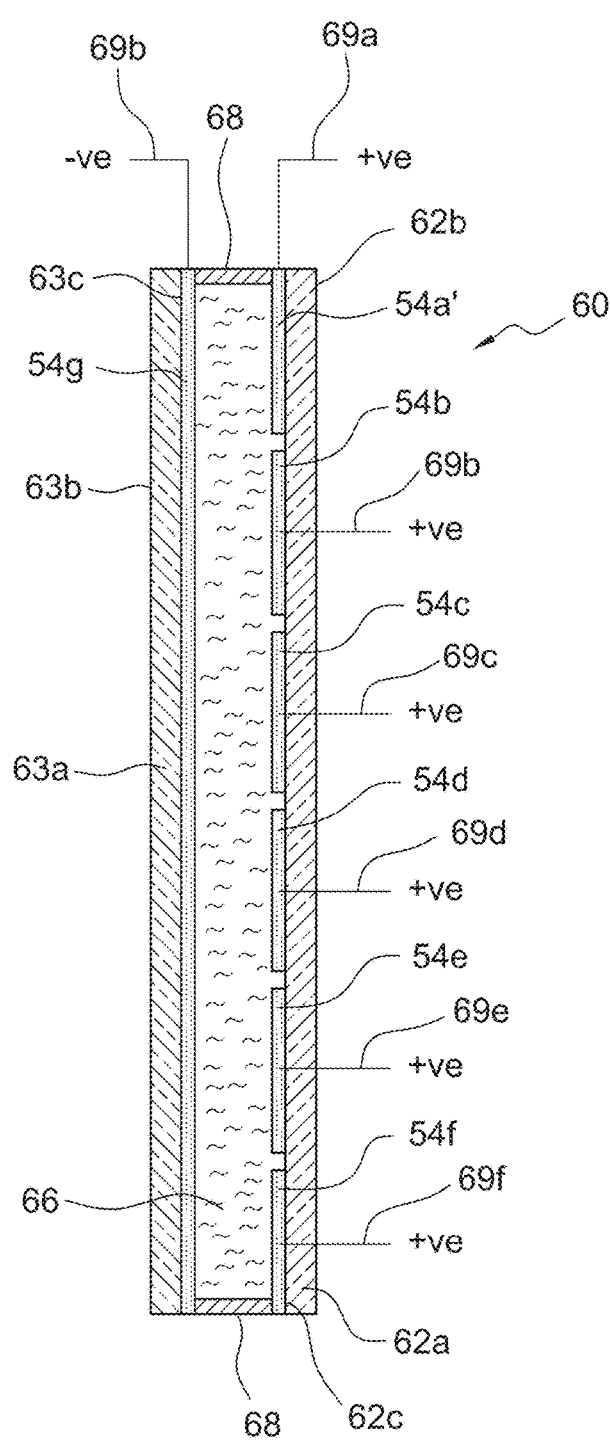
Figures 6, 7:
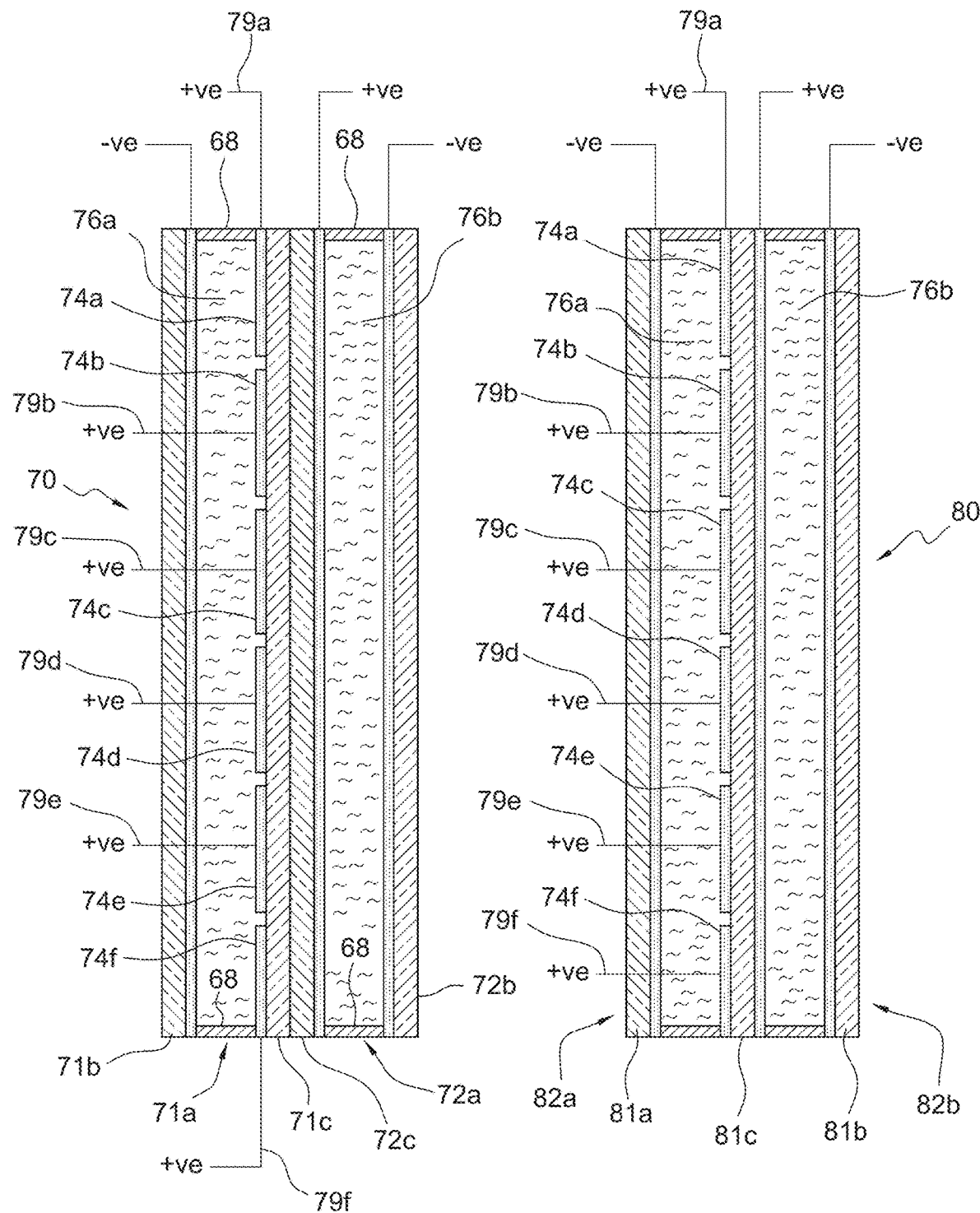
Figure 8C:
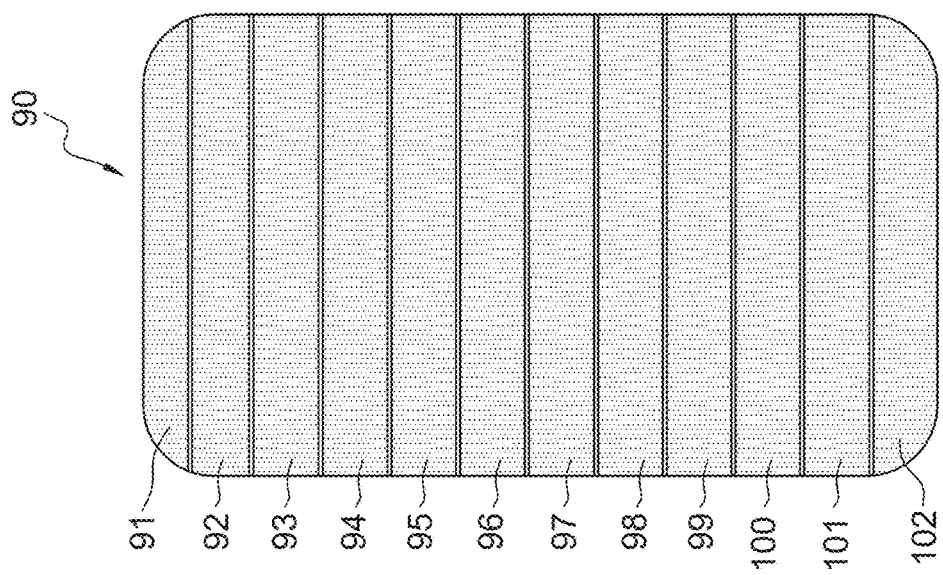
Figure 8B:
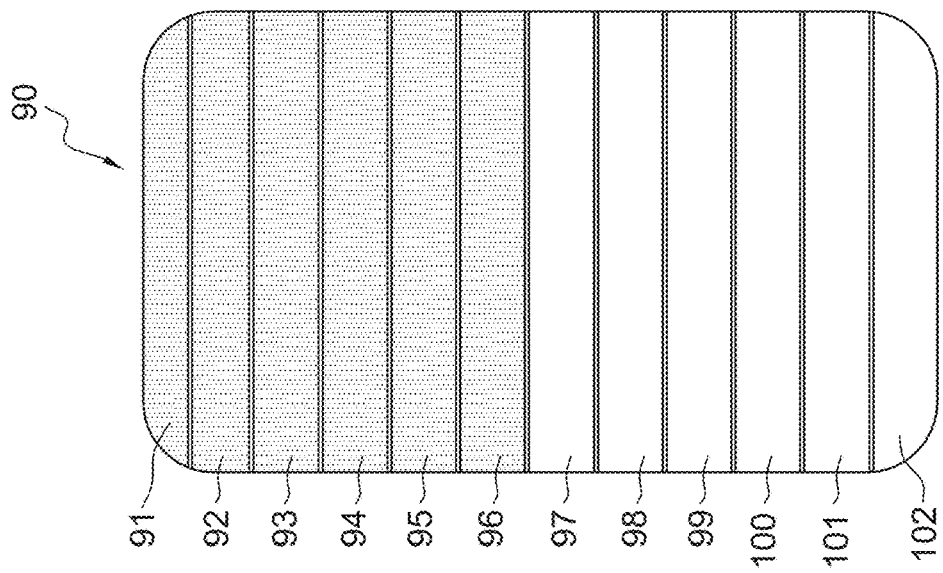
Figure 8A:
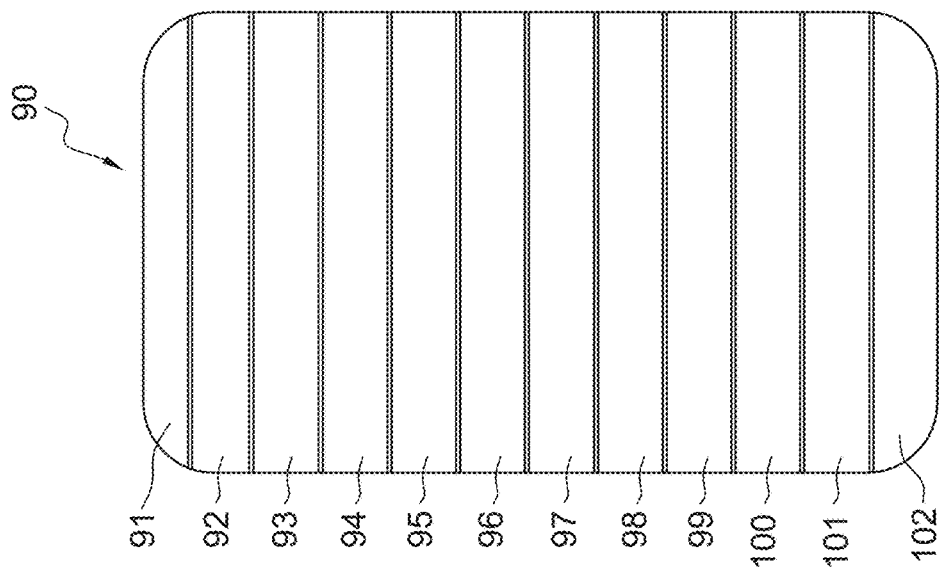
Figure 9C:
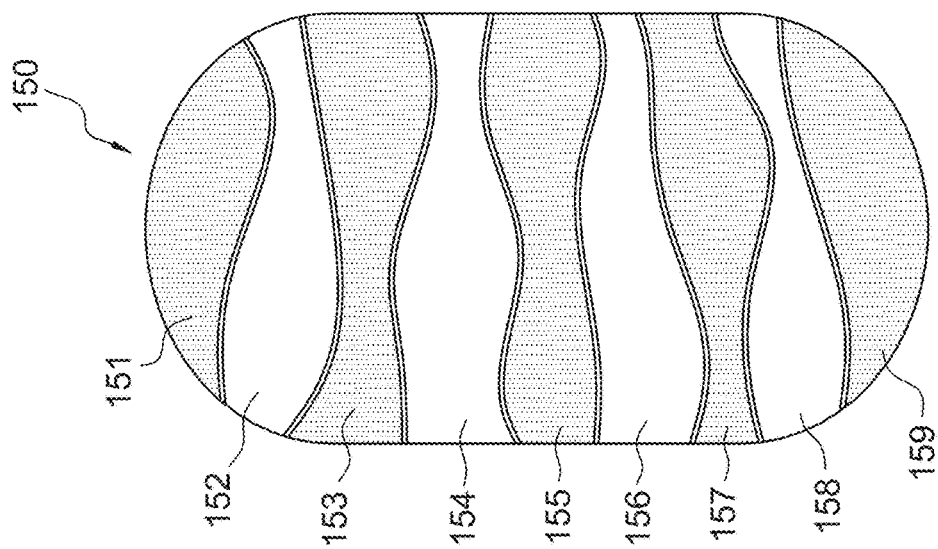
Figure 9B:
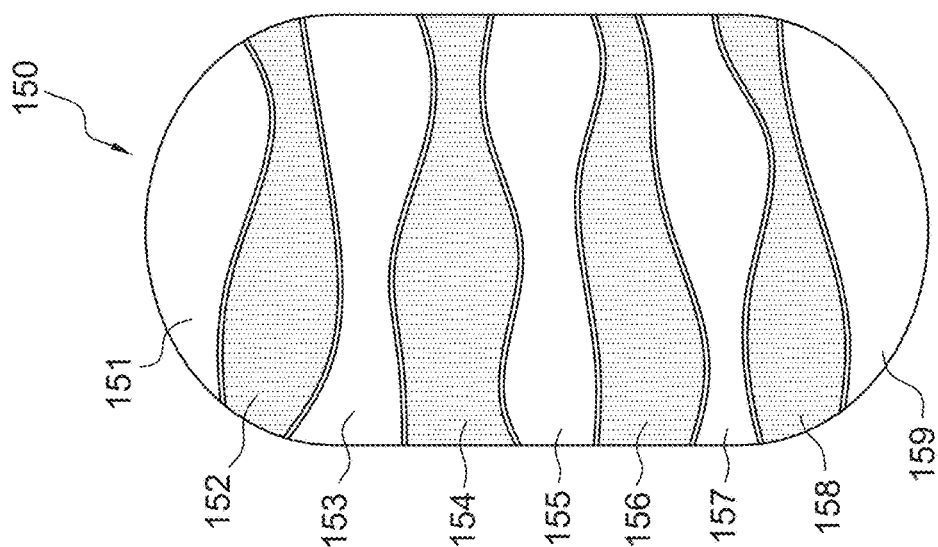
Figure 9A:
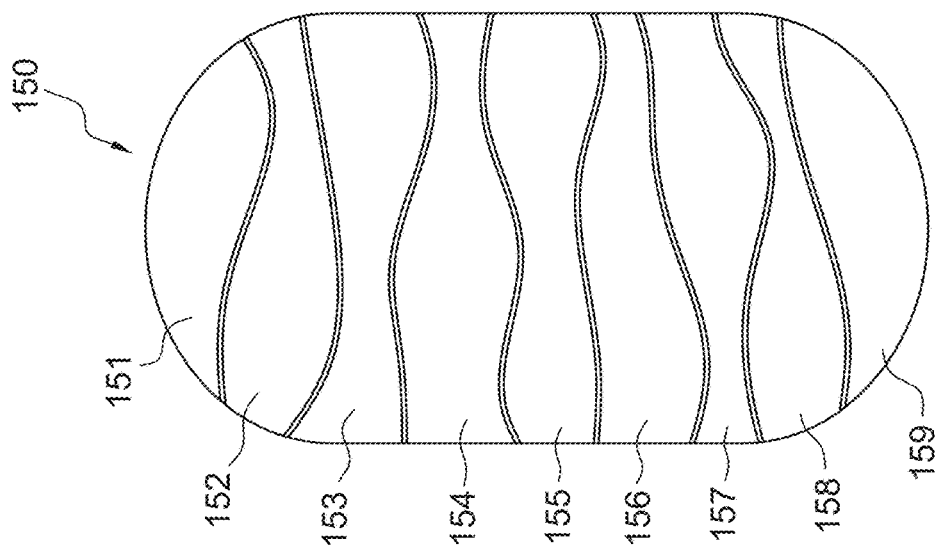
Figure 10:
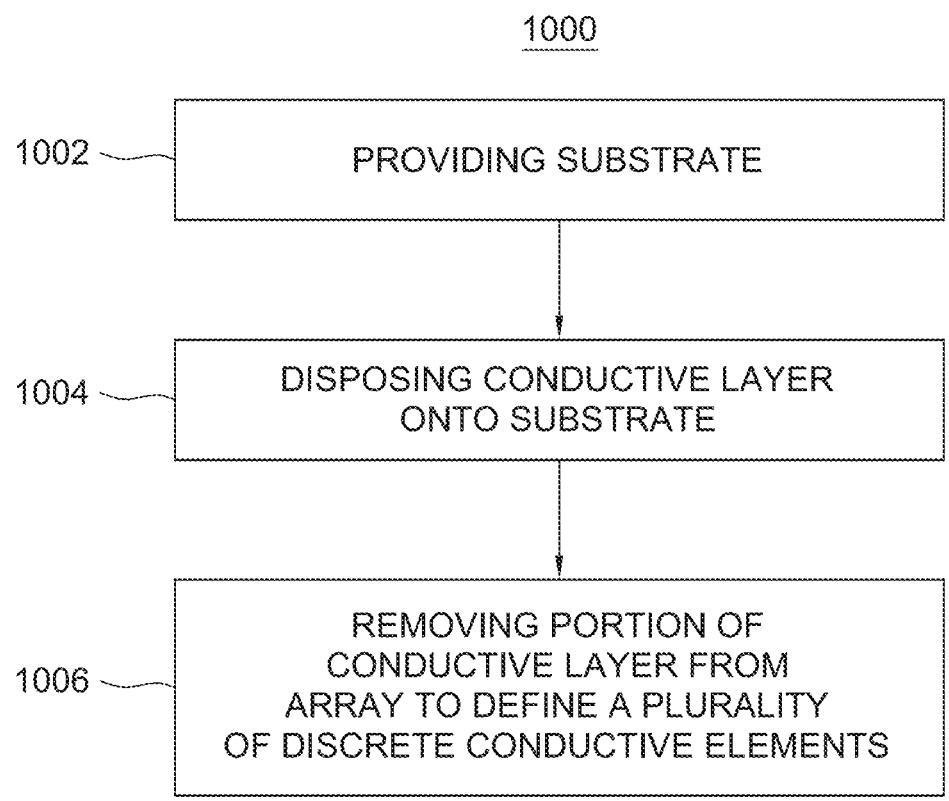
Figure 11:
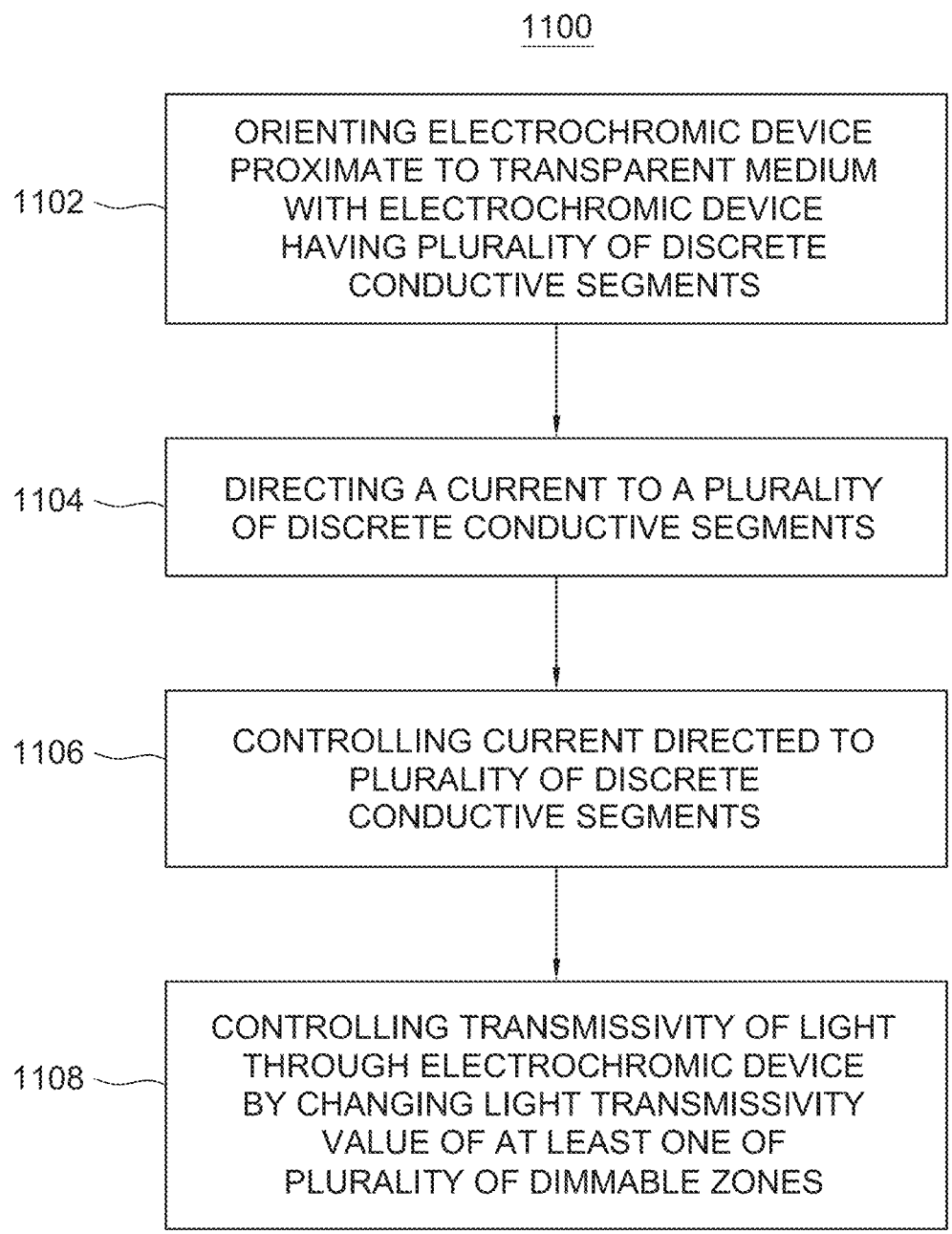

Having thus described variations of the disclosure in general terms, reference will now be made to the accompanying drawings, which are not necessarily drawn to scale, and wherein:

FIG. 1 is an illustration of an aircraft;

FIG. 2 is an exploded perspective view of an aircraft interior showing a window assembly;

FIG. 3A is a cross-sectional view of the window assembly shown in FIG. 2 in an assembled state;

FIG. 3B is a cross-sectional view of the window assembly as shown in FIG. 3A, with a dust cover inserted in place into the window assembly;

FIG. 4 is a cross-sectional view of a representative electrochromic assembly;

FIG. 5 is a cross-sectional view of an electrochromic assembly according to aspects of the present disclosure;

FIG. 6 is a cross-sectional view of an electrochromic assembly according to further aspects of the present disclosure;

FIG. 7 is a cross-sectional view of an electrochromic assembly according to further aspects of the present disclosure;

FIGS. 8A-8C are views of electrochromic windows according to aspects of the present disclosure showing a plurality of dimmable zones;

FIG. 9A-9C are views of electrochromic windows according to aspects of the present disclosure showing a plurality of irregularly-shaped dimmable zones; and FIGS. 10 and 11 are flowcharts outlining methods according to aspects of the present disclosure.

DETAILED DESCRIPTION

According to an aspect of the present disclosure, electrochromic arrays comprise layers of material that can be deposited onto or oriented proximate to a transparent substrate of an assembly for the purpose of changing the appearance and function of the assembly itself. For the electrochromic devices of the present disclosure, suitable substrates include substantially transparent substrates made from materials including glass, and other transparent materials, including, for example, transparent polymeric materials having a low refractive index (about 1.5) and including, for example, plastics such as acrylic, polystyrene, polycarbonate, allyl diglycol carbonate, styrene acrylonitrile, copolymer (SAN); poly(4-methyl-1-pentene), polyester, polyamide, etc. Plastic substrates may be further treated with, for example, anti-abrasion coatings. Suitable substrate glass materials (e.g., a regular soda lime or soda-lime silica float glass, boroaluminosilicate glass, etc.) may be tempered or untempered. The term "substantially transparent" refers to materials having a light transmissivity greater than about 60%, or equal to the light transmissivity of tempered or untempered glass.

The substrates may be of any thickness as long as the substrate has a sufficient thickness and adequate mechanical properties to support an electrochromic stack disposed onto the substrate. Suitable substrate thicknesses include those ranging from about 0.01 mm to about 10 mm thick. If multi-pane substrates are used, the substrate panes may be of the same or different thicknesses.

According to the present disclosure electrochromic arrays include a layer or layers of electrochromic material that may be in the form of a solid, or in the form of a gel-like suspension. The present invention contemplates the use of electrochromic materials known to be useful in producing electrochromic effects when energized including, for example, transition metal oxides, "Prussian blue systems", viologens, conducting polymers, transition metal and lanthanide coordination complexes and metallopolymers, metal phthalocyanides, etc.

According to aspects of the present disclosure, transition metal oxides include, for example, tungsten oxide ($WO_3$), molybdenum oxide ($Mo_3$) vanadium oxide ($VO_3$), niobium oxide ($NbO_3$), iridium oxide ($IrO_3$), nickel oxides ($NiO_xH_y$), etc. According to further aspects, "Prussian blue systems" include, for example, Prussian blue $[Fe^{III}Fe^{II}(CN)_6]^-$ (Prussian blue); $[Fe^{III}Fe^{II}(CN)_6]$ (Prussian brown); $[Fe^{III}Fe^{II}(CN)_6]_2$ and $[Fe^{II}(CN)_6]^=$ (Prussian green); and $[Fe^{III}Fe^{II}(CN)_6]^{2-}$ (Prussian white), etc. According to further aspects, viologens include, for example, 1,1'-disubstituted-4-4'-bipyridinium salts, etc. Further aspects contemplate conducting polymers including, for example, polypyrrole, polythiophene, polyaniline, etc. Additional aspects include transition metal and lanthanide coordination complexes and metallopolymers including, for example, metal hydrides, nitrosyl- and oxo-molybdenum complexes; ruthenium complexes such as, for example tris(bypyridene)ruthenium(II)chloride, etc. Still further aspects contemplate metal phthalocyanines including, for example, luthenium phthalocyanine, etc.

According to aspects of the present disclosure, as described herein, when the electrochromic material is in the form of a gel, or "gel-like" material or suspension, the gel is chambered and oriented or "sandwiched" between substrate material panels or panes. According to further aspects, the thickness of the electrochromic layer so-oriented in the electrochromic devices of the present disclosure ranges from about 0.005" to about 0.060" (from about 0.125 mm to about 1.5 mm), and more preferably is about 0.022" (about 0.56 mm).

According to further aspects, conductive layer materials useful in the manufacture of the thin conductive layers of electrochromic arrays or "stacks" include, for example, metals, doped metals, metal oxides, doped metal oxides, including fluorine-doped tin oxide and tin-doped indium oxide (ITO, or indium/tin oxide). According to aspects of the present disclosure, the thin conductive coatings are transparent, at least in the range of wavelengths where electrochromism is exhibited by the electrochromic layer. Examples of thin metal transparent conductive layers include, for example, gold, platinum, silver, aluminum, nickel alloy, etc. Examples of metal oxide and doped metal oxide transparent conductive layers (that may be doped with one or more metals) include indium oxide, indium tin oxide, doped indium oxide, tin oxide, doped tin oxide, zinc oxide, aluminum zinc oxide, doped zinc oxide, ruthenium oxide, doped ruthenium oxide, etc. Such useful oxides are referred to as "transparent conductive oxides."

The thin conductive layers preferably have a thickness ranging from about 2000 to about 4000 Angstroms. In some instances, the substrate layer may comprise a glass or polymeric material that, itself, includes a conductive material (e.g., a glass substrate material coated with a fluorinated tin oxide, etc.).

The conductive layers may also comprise a composite conductor material (e.g., a highly conductive ceramic with metal with metal wires or nanowires that are invisible to the eye, and having a thickness of about 100 μm or thinner, etc.).

Further aspects include the use of thin layers of primer materials to improve adhesion of the electroconductive thin films to substrate material. Preferred primers include acrylate copolymers, preferably copolymers of acrylic acid and a substituted acrylate such as hydroxyethylacrylate, cyanoethylacrylate, etc.

The thin layers (e.g., thin layers of indium tin oxide, etc.) can be deposited onto a substrate material or onto one another using thin film deposition techniques including physical vapor deposition, electron beam evaporation, sputter deposition techniques, etc.

FIG. 1 is an illustration of an aircraft 10 having a fuselage 12. Fuselage section 14 of fuselage 12 is shown having structural window panes 15.

FIG. 2 shows an interior of aircraft 10 including an interior exploded perspective view of the fuselage section 14, including an array of structural window panes 15. As shown in FIG. 2, spaces for windows to be inserted in the fuselage are defined by window housings 16. As shown in FIG. 2, retaining clips 16a engage electrochromic window assembly 18, although any means for retaining a window in place including, for example, seals to accommodate a friction fit, pins, screws, tabs, etc. made from any suitable material are further contemplated according to aspects of the present disclosure. Electrochromic window assembly 18 further includes an electrochromic pane 20 that comprises an electrochromic device. Interior panel 22 includes an interior window housing 24 and a window controller housing 30 into which is fitted a window controller 28. Dust cover housing 26 including dust cover pane 26a that is dimensioned to fit into interior window housing 24.

FIG. 3A is a cross-sectional side view of a window assembly 32 (not necessarily drawn to scale) comprising the parts shown in FIG. 2 in an assembled state. As shown in FIG. 3A, a structural window pane 15 is shown held in position proximate to the fuselage 14 via retaining structure 15a. The structural window can be physically attached to the fuselage by any method and means as desired and in accordance with regulations pertaining to aircraft manufacture. The electrochromic window assembly 18 is shown inserted in place and retained in place via clips 40, 42. The electrochromic pane 20 is shown such that a space 38 is defined between the structural window pane 15 and the electrochromic pane 20. By way of illustrating comparative dimensions within the window assembly, and according to an aspect of the present disclosure, the maximum distance $d_1$ (i.e., max value) from the structural window pane 15 to the electrochromic pane 20 approximately equals 0.66" (17 mm). The minimum distance $d_2$ from the electrochromic pane 20 to interior surface of the structural pane 15 (minimum value) is about 0.32" (8 mm).

FIG. 3B is a cross-sectional side view of the window assembly 32 as shown in FIG. 3A, with a dust cover 26 shown in position in the window assembly 32. According to the illustrated aspect, once the dust cover 26 (shown in place in FIG. 3B) is inserted in place into the interior window housing 24 (as shown in FIG. 2), the distance $d_3$ from the dust cover pane 26a to the electrochromic pane 20 is about 1.53" (39 mm). FIGS. 3A and 3B, further show a window controller 28 in place adjacent to an exterior surface of interior panel 22, and accessible through window controller housing 30 in interior panel 22. Foam surround 44, as shown in FIGS. 3A and 3B is a flexible closed-cell foam frame that serves as a mount for the electrochromic pane 20 and serves as a seal against the structural pane 15 and the dust cover 26 to prevent moisture accrual, including condensation.

FIG. 4 is a cross-sectional side view of a representative transparent electrochromic device including continuous conductive layers. As shown in FIG. 4, a transparent electrochromic device 50 includes first and second transparent substrates 52a and 53a respectively. First substrate 52a includes a first substrate outer surface 52b and a first substrate inner surface 52c. Disposed on first substrate inner surface 52c is a continuous first conductive layer 54a. Second substrate 53a includes a second substrate outer surface 53b and a second substrate inner surface 53c. Disposed on second substrate inner surface 53c is a second continuous conductive layer 54b. The first and second substrates 52a and 53a are spaced apart a distance equal to the dimension of spacers 58. An electric circuit is provided to the electrochromic device 50 with current introduced from a power source (not shown) via electrical contact 59a to conductive layer 54a. As shown, once the circuit is powered, ions migrate from the first conductive element 54a across an electrochromic medium 56 to a second conductive layer 54b. Electrical contact 59b is in communication with a power source (not shown). As the circuit is powered, an electrochromic change occurs in the electrochromic medium 56, resulting in a change in the ambient light that is allowed to pass through electrochromic device 50.

FIG. 5 illustrates aspects of the present disclosure and shows a cross-sectional side view of a transparent electrochromic device, including a plurality of conductive coating segments. As shown in FIG. 5, electrochromic device 60 includes first and second transparent substrates 62a and 63a respectively. First transparent substrate 62a includes a first substrate outer surface 62b and a first substrate inner surface 62c. Second transparent 63a includes a second substrate outer surface 63b and a second substrate inner surface 63c. Disposed on second substrate inner surface 63c is a continuous conductive layer 54g. The two substrates spaced apart from one another to a distance equal to spacers 68. In contrast to the device shown in FIG. 4, according to aspects of the present disclosure, the electrochromic device shown in FIG. 5 includes a plurality of discrete conductive segments 54a', 54b, 54c, 54d, 54e, and 54f disposed on the first substrate inner surface 62c. The discrete conductive segments are equivalently referred to herein as discrete conductive elements.

Separate electrical circuits are provided to each discrete conductive segment via corresponding electrical contacts 69a, 69b, 69c, 69d, 69e, and 69f brought into contact with each discrete conductive segment (54a', 54b, 54c, 54d, 54e, and 54f). Each of the electrical contacts is in communication with a power source (not shown). When power is supplied, the electrical circuits are completed by the migration of ions from the discrete conductive segments across the electrochromic medium 66 (e.g., electrochromic gel) to conductive layer 54g. Electrical contact 69b is in communication with a power source (not shown). As the circuit is powered, and electrical charges are selectively delivered in a desired and predetermined pattern to selected discrete conductive segments (54a', 54b, 54c, 54d, 54e, and 54f that are disposed on transparent substrate 62a), an electrochromic change occurs in electrochromic medium 66 in the vicinity of the conductive paths emanating from each of the electrically activated discrete conductive segments 54a', 54b, 54c, 54d, 54e, and 54f. In this way, selective activation of discrete conductive segments causes a predetermined impact on the electrochromic medium adjacent or proximate to an activated discrete conductive segment.

For the purpose of the present specification, the term "adjacent" encompasses the meaning of the term ":substantially adjacent" with the two terms being used equivalently and interchangeably herein. Similarly, the term "proximate" encompasses the meaning of the term "substantially proximate" and is used equivalently and interchangeably herein. According to present aspects, the electrochromic medium that contacts a current emanating from a discrete conductive segment will experience an electrochromic change. In addition, the electrochromic medium in the vicinity of a discrete conductive segment emanating current will also experience an electrochromic change. The total volume of electrochromic medium in the vicinity of a discrete conductive segment that will experience an electrochromic change and become a dimmable zone (as well as the speed with which the electrochromic change occurs) depends upon the total current running through an electrical circuit of which the electrochromic medium is a part.

The predetermined and tailored impact on areas within the electrochromic medium 66 results in a plurality of dimmable zones in the electrochromic medium 66, and produces a predetermined and tailored change in the ambient light that is allowed to pass through the affected areas (e.g. the dimmable zones) created in the electrochromic medium 66 of the electrochromic device 60.

FIGS. 6 and 7 incorporate many of the features described in FIG. 5. FIGS. 6 and 7 show a cross-sectional view of a transparent electrochromic device including a plurality of dimmable zones in an electrochromic medium. However, FIGS. 6 and 7 illustrate additional aspects of the present disclosure by showing two electrochromic portions combined together into a single electrochromic device. The devices shown in FIGS. 6 and 7, compound the desired light blocking effects to achieve an electrochromic device that can be activated to reduce the transmissivity of ambient light to 0.01% or lower. Stated another way, the devices illustrated in FIGS. 6 and 7 illustrate aspects of the present disclosure wherein, electrochromic devices having a plurality of dimmable zones in the electrochromic medium can be activated such that any or all of the discrete dimmable zones so activated can block up to 99.99% or more of ambient light from passing through the dimmable zones of the electrochromic device.

FIG. 6 illustrates one aspect of the present disclosure and shows a cross-sectional side view of a transparent electrochromic device 70 including a plurality of discrete conductive segments in a first electrochromic portion 71a (and substantially similar to the electrochromic device 60 shown in FIG. 5) now coupled to a second electrochromic portion 72a. As shown in FIG. 6, transparent substrates 71b and 71c "house" the first electrochromic device portion 71a and transparent substrates 72b and 72c "house" a second electrochromic device portion 72a. First and second electrochromic portions, 71a and 72a respectively, are positioned proximate to one another or are otherwise positioned together or joined together to form the single electrochromic device 70. A plurality of discrete conductive segments 74a, 74b, 74c, 74d, 74e, 74f, is shown disposed onto substrate 71c. Again, the electrochromic portion 71a is meant to be depicted as similar to device 60 shown in FIG. 5. The electrochromic device illustrated in FIG. 6 includes four (4) transparent substrates, or "panes" (71b, 71c, 72b, and 72c), and therefore represents a "4-pane" electrochromic device according to aspects of the present disclosure.

According to further aspects of the present disclosure, FIG. 7 shows a cross-sectional side view of a transparent electrochromic device including a plurality of conductive coating segments used to form a plurality of dimmable zones in the electrochromic medium in an electrochromic device 80 similar to the electrochromic device 70 shown in FIG. 6, with the notable exception that a single transparent substrate 81c is positioned to obviate the need for the two separate transparent substrates 71a and 72a shown in FIG. 6. The electrochromic device 80 illustrated in FIG. 7 includes three (3) transparent substrates, or "panes" (81a, 81b, and 81c), and therefore represents a "3-pane" electrochromic device according to aspects of the present disclosure.

As shown in FIGS. 6 and 7, additional electrochromic device portions, 72a and 82b respectively, are present to provide further system flexibility, and to assist in light-blocking versatility and capability of the assembled electrochromic devices 70, 80. While each individual electrochromic portion creates a light-blocking environment equal to or approaching about 99.99% light blocking (i.e., about 0.01% ambient light transmissivity), combining multiple electrochromic portions into one electrochromic device exceeds the 99.99% light blocking value accomplished by a single electrochromic device.

According to further aspects of the present disclosure, FIGS. 8A-8C and FIGS. 9A-9C are front views showing the varying appearance of windows comprising the electrochromic devices described herein and shown at least in FIGS. 5, 6, and 7. FIGS. 8A, 8B, and 8C show various transmissivity states or "stages" of an electrochromic window 90.

As shown in FIG. 8A, no current is supplied to the window 90 comprising the electrochromic devices disclosed herein (and of the electrochromic devices shown in FIGS. 5, 6, and 7). As sown in FIG. 8A, the electrochromic state of the window 90 is viewed at its most transmissive state, with ambient light allowed to pass through window 90 at a rate of near complete transmissivity of the substrate material. In the case of glass, light transmissivity is about 60%. Therefore, according to present aspects, in the "unpowered" state, where current is not directed to the discrete conductive segments, the transmissivity of the electrochromic devices presented herein is at its maximum light transmissivity value, and is dependent only on the light transmissivity of the substrate materials selected for use in the window construction, and any physical or chemical tinting that may or may not be present, as desired. A plurality of discrete conductive segments can be seen represented in FIGS. 8A, 8B and 8C as horizontally-oriented discrete conductive segments 91 to 102.

In FIG. 8B, an operator has engaged a control (not shown in FIG. 8A, 8B, or 8C) to direct an amount of current to discrete conductive segments 91 to 96. However, no current has been directed to discrete conductive segments 97-102. The electrochromic medium within the electrochromic device that resides adjacent to the discrete conductive segments 91-96 is activated to created dimmable zones adjacent to the discrete conductive segments and block, or otherwise impede a predetermined amount of light passing through the electrochromic device at the dimmable zones. As a result, transmissivity of ambient light through the dimmable zones adjacent to the discrete conductive segments 97 to 102 remains at a rate of maximum light transmissivity. However, the light transmissivity of the dimmable zones in the electrically activated electrochromic medium (e.g., the electrochromic medium electrically activated due to its location adjacent to the electrically powered discrete conductive segments 91-96) displays a reduced light transmissivity. In this way, according to aspects of the present disclosure, the electrically activated electrochromic medium that is adjacent to discrete conductive segments 91-96, by supplying predetermined amounts of current to segments 91-96, have reduced the amount of ambient light transmissivity through the dimmable zones to a reduced amount of transmissivity, and are shown in FIG. 8B as "shaded".

While FIG. 8B appears to show a relatively uniform degree of "shading" representative of "light-blocking" (e.g., reduced light transmissivity), aspects of the present disclosure contemplate varying amounts and conditions of current directed to any number of discrete conductive segments for the purpose of activating dimmable zones in the electrochromic medium to achieve a desired degree of reduced or varied degree of light transmissivity, or other desired visual effect at various discrete conductive segments in the electrochromic device. That is, if desired, an operator can activate a control to send controlled amounts of electrical current to any number of discrete conductive segments (e.g., segments 91 to 96) to partially or completely "dim" a zone of electrochromic medium that is adjacent, or proximate to any discrete conductive segment.

In FIG. 8C, an operator has engaged a control to direct an amount of current to discrete conductive segments 91 to 102. The light transmissivity of the dimmable zones of electrochromic medium adjacent to discrete conductive segments 91 to 102 (that have been electrically activated by supplying current thereto) has been reduced in each dimmable zone from a maximum transmissivity value to a reduced light transmissivity value, and is shown as "shaded". As with FIG. 8B, while FIG. 8C appears to show a relatively uniform degree of "shading", aspects of the present disclosure contemplate the ability to vary each dimmable zone associated with a corresponding discrete conductive segment to achieve a desired degree of reduced light transmissivity through various areas of the device. That is, if desired, an operator can activate a control to send controlled amounts of electrical current to any number of discrete conductive segments 91 to 102 to partially or completely "dim" a zone of electrochromic medium that is adjacent, or proximate to a discrete conductive segment.

According to the present disclosure, "complete dimming" refers to a state where 99.99% or more of ambient light is blocked from passing through a "completely dimmed" dimmable zone. Partial dimming refers to a state where less than 99.99% of ambient light is blocked from passing through a partially dimmed dimmable zone. Partial dimming therefore represents dimming of a dimmable zone from a perceptible degree of ambient light-blocking (e.g., about 5%), to virtually complete light-blocking (e.g., about 99.99%, equating to virtual darkness referred to equivalently herein as "complete" or "total" darkness).

According to aspects of the present disclosure, a plurality of discrete conductive segments can be activated in an electrochromic device for the purpose of changing the appearance of dimmable zones in the electrochromic medium, and tailoring the appearance of structures comprising the electrochromic devices. For example, in a vehicle window or other structural window, the plurality of dimmable zones can be activated in a predetermined sequence (e.g., a programmed sequence selected to power discrete conductive segments at varying amounts of current and in various continuous or discontinuous order, etc.) such that the appearance of a window comprising an electrochromic device, according to present aspects, changes to accommodate a user relative to, not only the general appearance of the window but, for example, a window's light transmissivity. In this way, the total amount of ambient light passing through any or all regions of a window to an occupant, as well as particular wavelengths of ambient light passing through various areas of a window (e.g., particularly undesirable light wavelengths such as light at a wavelength of about 520 nm that is thought to contribute to particularly unwanted glare in a human eye) can be diminished or virtually completely blocked to virtually any degree according to aspects of the present disclosure.

FIGS. 9A, 9B, and 9C illustrate three "stages" altering the appearance of window 150 incorporating the presently described electrochromic devices. As shown in FIG. 9A, no current is supplied to the electrochromic device. As a result, the electrochromic state of the window 150 as shown in FIG. 9A is viewed at its most light transmissive state, with ambient light allowed to pass through window 150 at a rate of near complete transmissivity. Therefore, according to present aspects, in the "unpowered" state, where current is not directed to the discrete conductive segments, the transmissivity of the electrochromic devices presented herein is at its maximum light transmissivity value, and is dependent only on the substrate materials selected for use in the window construction and any physical or chemical tinting that may or may not be present, as desired. A plurality of discrete conductive segments can be seen represented in FIGS. 9A, 9B and 9C as irregularly- (e.g., non-linearly) oriented discrete conductive segments 151 to 159. It is further understood that, if desired, the boundaries between the discrete conductive segments may not be visible to the naked human eye in the unpowered state, or may only be slightly visible.

In FIG. 9B, an operator has engaged a control (not shown in FIGS. 9A-9C) to direct an amount of current to discrete conductive segments 152, 154, 156, and 158, resulting in the dimming of dimmable zones in the electrochromic medium that are adjacent or proximate to the discrete conductive segments. In this way, the light transmissivity of the dimmable zones in the electrochromic medium corresponding to and otherwise regulated by the discrete conductive segments 152, 154, 156, and 158 (that are shown in FIG. 9B as having been electrically activated by supplying current to dimmable segments 152, 154, 156, and 158) have reduced the amount of light transmissivity of ambient light through the corresponding dimmable zones, and are shown as "shaded". However, no current has been directed to discrete conductive segments 151, 153, 155, 157, and 159. As a result, light transmissivity of ambient light through the dimmable zones in the electrochromic medium existing adjacent to, and otherwise regulated by, discrete conductive segments 151, 153, 155, 157, and 159 remains at a rate of near complete light transmissivity.

While FIG. 9B appears to show a relatively uniform degree of "shading" in segments 152, 154, 156 and 158, aspects of the present disclosure contemplate varying the current delivered to each activated dimmable zone in the electrochromic medium to achieve a desired degree of reduced or enhanced light transmissivity for each dimmable zone, as desired. That is, if desired, an operator can activate a control to send the same or a comparatively varying amount of current to each discrete conductive segment 152, 154, 156, and 158 to partially or completely "dim" or lighten each desired dimmable zone in the electrochromic medium to a varying degree as compared to one or more of the adjacent dimmable zones.

In FIG. 9C, an operator has engaged a control to direct an amount of current to discrete conductive segments 151, 153, 155, 157, and 159. The dimmable zones of electrochromic medium that is regulated by the discrete conductive segments 151, 153, 155, 157, and 159 (that have been electrically activated by supplying current to discrete conductive segments 151, 153, 155, 157, and 159) have reduced the amount of ambient light transmissivity through these dimmable zones to a reduced amount of transmissivity, and are shown as "shaded". As with FIG. 9B, while FIG. 9C appears to show a relatively uniform degree of "shading", aspects of the present disclosure contemplate varying the light transmissivity of each or all individual dimmable zones to achieve a desired degree of reduced or enhanced light transmissivity.

According to aspects of the present disclosure, any practical number of dimmable zones can be present in the electrochromic devices disclosed herein, limited only by the practical number of discrete conductive segments, or other electrical current-regulating systems or programs. Further, the sequencing of current from a power source to the device can regulate the electrochromic medium to produce any desired visual effect. For example, a controller can be engaged by a user to initiate a programmed sequencer or other electrical controller to produce effects including, for example, the predetermined appearance of movement across changing dimmable zones of the electrochromic windows. For example, such movement can include the appearance of a window shade rolling downward or upward to progressively decrease or increase a window's ambient light transmissivity. In this example, discrete conductive segments are activated and deactivated, (e.g., according to a sequencing program, to deliver the current required to achieve a desired effect in the dimmable zones in the electrochromic medium that are regulated by various discrete conductive segments) to decrease or increase the amount of ambient light transmissivity through dimmable zones in the electrochromic device in the window.

According to further aspects, any visual image including, for example, logos, artwork, scenes, geometric shapes, including images with or without movement, can be achieved through programming and current sequencing as desired. Of particular interest, certain wavelengths of ambient light associated with glare, or other unwanted effect, can be eliminated from as many dimmable zones as desired, including light wavelengths occurring at or about, for example, 520 nm in the visible light spectrum. In this way, according to present aspects, an occupant in a position relative to the disclosed electrochromic window is able to adjust and personally tailor an environment proximate to the electrochromic window that allows the passage of varying amounts and intensities of light wavelength ranges through the electrochromic window, or that blocks amounts of light (e.g., up to and including blocking about 99.99% or more of ambient light) that would otherwise be admitted into an area proximate to the window in the absence of the windows comprising the electrochromic devices disclosed herein.

According to further aspects, windows, for example in a vehicle (e.g., an aircraft or train, automobile, bus, tram, watercraft, spacecraft, etc.) may include circuitry that is in communication with a central controller, sequencer, or other operating system including, for example, a computer that can override individual controllers at, or proximate to, the windows themselves, and that could otherwise be controlled and operated by individual occupants. According to such aspects, the ambient light environment of an entire cabin interior can be "light controlled" centrally, or by one command, for example, by a conductor, pilot, attendant etc., to collectively allow or block light to virtually any degree; even achieving light blocking values ranging from about 90% to about 99.99% or more.

By way of illustrative example, the electrochromic devices and systems, according to aspects of the present disclosure, can be powered according to the following non-limiting protocols. The inrush current for 28 VDC load equipment supplied by a remote power distribution unit (RPDU) is preferably limited to 9 times the solid state power controller (SSPC) rating, and should have a maximum of 65 mA steady state current in the minimal VLT state during normal operating ranges. Preferred systems have a maximum of 92 mA for transitioning from the maximum VLT state to the minimum VLT state during normal operating range. For systems operated independently by passengers (e.g., on an aircraft), the electrochromic window systems can operate on 28 VDC Type I power within a voltage range of 20 to 22 VDC.

FIGS. 10 and 11 are flowcharts outlining methods according to aspects of the present disclosure. As shown in FIG. 10 one aspect is directed to a method 1000 for forming an electrochromic device, with the method comprising providing 1002 a first substrate and disposing 1004 a conductive layer onto the first substrate. The method further comprises removing 1006 a portion of the conductive layer from the first substrate to define and form a plurality of discrete conductive segments.

In a further aspect, as shown in FIG. 11, a method 1100 is disclosed for controlling the transmission of light through a substantially transparent medium, with the method including orienting 1102 an electrochromic device proximate to the transparent medium. The electrochromic includes a first transparent substrate having an outer surface and an inner surface and a first conductive layer disposed on the inner surface of the first transparent substrate. The electrochromic device further includes a second transparent substrate having an outer surface and an inner surface and a second conductive layer disposed on the inner surface of the second transparent substrate. The electrochromic device further includes an electrochromic medium disposed between the first conductive layer and the second conductive layer, with the electrochromic medium having an initial light transmissivity value. At least one of the first and second conductive layers further comprises a plurality of discrete conductive segments, and the electrochromic medium is disposed adjacent the plurality of discrete conductive segments to form a plurality of dimmable zones adjacent to the plurality of discrete conductive segments. A current is directed and controlled from a power source to at least one of the plurality of discrete conductive segments. The transmission of light through the electrochromic device is controlled by changing the initial light transmissivity value of at least one of the plurality of dimmable zones to a desired light transmissivity value ranging from an initial unrestricted light transmissivity (e.g., about 60% through glass) to about 0.01% light transmissivity, or less. A controller is in communication with the power source. The method further includes directing 1104 a current from the power source to a plurality of discrete conductive segments, with each of the discrete conductive segments corresponding to a dimmable zone in the electrochromic medium. The method further comprises controlling 1106 current directed to the plurality of discrete conductive segments, and controlling 1108 the transmission of light (e.g., the transmissivity of light), through the electrochromic device by changing the initial light transmissivity value of at least one of a plurality of dimmable zones in the electrochromic medium to a desired light transmissivity value of each dimmable zone ranging from about 60% transmissivity to about 0.01% transmissivity, or less.

The present invention may, of course, be carried out in other ways than those specifically set forth herein without departing from essential characteristics of the invention. The present aspects are to be considered in all respects as illustrative and not restrictive, and all changes coming within the meaning and equivalency range of the appended claims are intended to be embraced therein.

What is claimed is:

1. An electrochromic device comprising:
    a first transparent substrate having a first transparent substrate outer surface and a first transparent substrate inner surface;
    a first conductive layer disposed on the first transparent substrate inner surface;
    a second transparent substrate having a second transparent substrate inner surface and a second transparent substrate outer surface;
    a second conductive layer disposed on the second transparent substrate inner surface;

an electrochromic medium disposed between the first conductive layer and the second conductive layer;
wherein one of the first conductive layer and second conductive layer comprises a plurality of conductive segments;
an electrical contact in communication with each conductive segment of the plurality of conductive segments, said electrical contact in communication with a power source;
wherein each conductive segment of the plurality of conductive segments is configured to separately form a dimmable zone substantially adjacent to the conductive segment in the electrochromic medium when power a current is supplied to the conductive segment from the power source; and
wherein the dimmable zone is configured to block an amount of ambient light transmissivity through the device in an amount ranging from about 40% to about 99.99%.

2. The device of claim 1, wherein each conductive segment is configured to contact a separate electrical circuit.

3. The device of claim 1, wherein at least one conductive segment is bounded by a perimeter, said perimeter comprising a substantially non-conductive material.

4. The device of claim 1, wherein each dimmable zone comprises an initial light transmissivity value, said light transmissivity value ranging from about 0.01% to about 60%.

5. A window comprising the electrochromic device of claim 1.

6. A vehicle comprising the window of claim 5.

7. An aircraft comprising the window of claim 6.

8. The electrochromic device of claim 1, wherein a controlled electrical current is delivered from the power source to at least one conductive segment.

9. The electrochromic device of claim 8 wherein the second transparent substrate comprises a plurality of conductive segments.

10. A window comprising the electrochromic device of claim 9.

11. A vehicle comprising the window of claim 10.

12. An aircraft comprising the window of claim 11.

13. A method for forming an electrochromic device, said method comprising;
providing a first substrate and a second substrate;
disposing a first transparent conductive layer onto the first substrate; and
removing a portion of the transparent conductive layer from the first substrate to define a plurality of conductive segments in the first transparent conductive layer;
electrically contacting each conductive segment of the plurality of conductive segments with a separate electrical contact, said separate electrical contact in communication with a power source;
wherein each conductive segment of the plurality of conductive segments is configured to separately form a dimmable zone substantially adjacent to the conductive segment in the electrochromic medium when power a current is supplied to the conductive segment from the power source; and
wherein each dimmable zone is configured to block an amount of ambient light transmissivity through the device in an amount ranging from about 40% to about 99.99%.

14. The method of claim 13 further comprising:
coupling an electrical circuit to each of the conductive segments.

15. The method of claim 13, wherein the portion of transparent conductive layer is removed by applying energy from a laser to the first transparent conductive layer.

16. The method of claim 13, wherein the portion of the transparent conductive layer is removed by a method comprising at least one of: electro ablation, mechanical ablation; thermal ablation; chemical etching; and chemical peeling.

17. A method for controlling transmissivity of light through a substantially transparent medium, the method comprising:
orienting an electrochromic device proximate to the transparent medium, said electrochromic device comprising:
a first transparent substrate having an outer surface and an inner surface;
a first conductive layer disposed on the inner surface of the first transparent substrate;
a second transparent substrate having an inner surface and an outer surface;
a second conductive layer disposed on the inner surface of the second transparent substrate;
an electrochromic medium disposed between the first conductive layer and the second conductive layer, said electrochromic medium having an initial light transmissivity value;
wherein one of the first conductive layer and second conductive layer comprises a plurality of conductive segments;
wherein each conductive segment is configured to separately form at least one dimmable zone substantially adjacent to the conductive segment in the electrochromic medium; and
wherein each dimmable zone is configured to block an amount of ambient light transmissivity through the device in an amount ranging from about 40% to about 99.99%;
directing individually an electric current from a power source individually to at least one of the plurality of discrete conductive segments, controlling individually the current directed to at least one of the plurality of conductive segments;
controlling individually transmissivity of light through the electrochromic device by changing individually the initial light transmissivity value of at least one of a plurality of dimmable zones to a desired light transmissivity value ranging from about 60% light transmissivity to about 0.01% light transmissivity.

18. The vehicle of claim 6, wherein the vehicle is selected from the group consisting of: a train, an automobile, a bus, a tram, a watercraft, and a spacecraft.

19. The method of claim 17 further comprising:
coupling an electrical circuit to each of the conductive segments.

* * * * *